(12) United States Patent
Lin (10) Patent No.: US 9,189,031 B2
(45) Date of Patent: Nov. 17, 2015

(54) AUXILIARY KEYBOARD AND AUXILIARY INPUT DEVICE

(71) Applicant: Chia-Ching Lin, Taipei (TW)

(72) Inventor: Chia-Ching Lin, Taipei (TW)

( * ) Notice: Subject to any disclaimer, the term of this patent is extended or adjusted under 35 U.S.C. 154(b) by 399 days.

(21) Appl. No.: 13/791,790

(22) Filed: Mar. 8, 2013

(65) Prior Publication Data

US 2014/0190809 A1    Jul. 10, 2014

(30) Foreign Application Priority Data

Jan. 7, 2013    (TW) .............................. 102200297 U (51) Int. Cl.
| | |
|---|---|
| *H01H 13/76* | (2006.01) |
| *H01H 13/72* | (2006.01) |
| *H01H 9/26* | (2006.01) |
| *G06F 1/16* | (2006.01) |

(52) U.S. Cl.
CPC ...... *G06F 1/1671* (2013.01); *G06F 2200/1633* (2013.01); *G06F 2203/04809* (2013.01); *H01H 2223/028* (2013.01); *H01H 2223/044* (2013.01)

(58) Field of Classification Search
CPC ....... H01H 13/72; H01H 13/76; H01H 13/70; H01H 1/00; H01H 3/00; H01H 3/02; H01H 3/12; H01H 13/00; H01H 13/26; H01H 13/50; H01H 2003/12; H01H 2021/00; H01H 2013/00; H01H 2201/00; H01H 2205/00; H01H 2221/00; H01H 2221/016; H01H 2233/00; H01H 2233/002; H01H 2233/008; H01H 2233/05; H01H 2233/07; H01H 2233/09; H01H 2237/00
USPC ......................................................... 200/5 A
See application file for complete search history.

(56) References Cited

U.S. PATENT DOCUMENTS

| | | | |
|---|---|---|---|
| 2006/0007645 A1* | 1/2006 | Chen et al. ..................... | 361/681 |
| 2012/0000759 A1* | 1/2012 | Chen ............................. | 200/5 A |

* cited by examiner

*Primary Examiner* — Edwin A. Leon
*Assistant Examiner* — Anthony R. Jimenez
(74) *Attorney, Agent, or Firm* — Li & Cai Intellectual Property (USA) Office (57) ABSTRACT

An auxiliary keyboard comprises an insulating board and a plurality of conductive keys. The insulating board has a sheet having a plurality of portions respectively defining a plurality of thru holes, a plurality of resilient supporting portions respectively connected to the sheet correspondingly arranged to the thru holes, and a plurality of combined portions respectively connected to the resilient supporting portions. The thickness of each combined portion is about 0.05 mm to 1 mm. Each conductive key is defined by a bonded portion and an exposed portion. The bonded portions of the conductive keys are respectively and seamlessly coupled to the combined portions, and the exposed portions are arranged to allow exposure from the insulating board. Thus, the conductive keys are firmly fixed on the insulating board by the connection between each conductive key and each combined portion. The instant disclosure also provides an auxiliary input device.

10 Claims, 13 Drawing Sheets

AUXILIARY KEYBOARD AND AUXILIARY INPUT DEVICE

BACKGROUND OF THE INVENTION

1. Field of the Invention

The instant disclosure relates to an input device; more particular, to an auxiliary input device and an auxiliary keyboard each used for a tablet PC.

2. Description of Related Art

With the growing popularity of the tablet PCs, the touch operation of the touch panel is more and more frequently. The tablet PC takes a virtual keyboard to instead of the traditional physical keyboard for saving weight and space.

However, the virtual keyboard does not achieve the convenient operation of the physical keyboard, because we must rely on the visual to determine the position of the virtual keys of the virtual keyboard, which is limiting the input speed. In contrast, the physical keyboard provides the tactile shape to the user, such that the user does not have to rely on the visual.

Thus, if the user needs to have a large number of key operations, the user will likely to install an external physical keyboard on the tablet PC. However, the external physical keyboard must be connected to the tablet PC by wire or wireless, such that the external physical keyboard needs to consume the power of the tablet PC. Therefore, the acceptance of the external physical keyboard connected to the tablet PC is only limited to a particular group, and has not been widely accepted by the users.

To achieve the abovementioned improvement, the inventors strive via industrial experience and academic research to present the instant disclosure, which can provide additional improvement as mentioned above.

SUMMARY OF THE INVENTION

One embodiment of the instant disclosure provides an auxiliary input device and an auxiliary keyboard each capable of the firm connection between the conductive keys and the insulating board.

The auxiliary keyboard for disposing on a tablet PC, comprising: an insulating board integrally formed includes a sheet having a first surface and an opposite second surface, in which the sheet has a plurality of portions respectively defining a plurality thru holes penetrating the first surface and the second surface; a plurality of resilient supporting portions each having a first end and an opposite second end in which the first end of each resilient supporting portion connects to the sheet, the resilient supporting portions are respectively connected to the portions of the sheet, and a plurality of combined portions respectively connected to the second ends of the resilient supporting portions, in which the thickness of each combined portion is about 0.05 mm to 1 mm; and a plurality of conductive keys of which each key is defined by a bonded portion and an exposed portion. The bonded portions of the conductive keys are respectively and seamlessly coupled to the combined portions, and the exposed portions are arranged to allow exposure from the insulating board. When the second surface of the insulating board is disposed on the tablet PC, each combined portion and a touch panel of the tablet PC are arranged with a predetermined distance therebetween. When pressing at least one of the exposed portions, the resilient supporting portion corresponding to the pressed exposed portion is deformed which causes the combined portion to correspondingly press against the touch panel.

The instant disclosure also provides an auxiliary input device for disposing on a tablet PC, comprising: an auxiliary keyboard which includes an insulating board integrally formed. The insulating board includes a sheet having a first surface and an opposite second surface, in which the sheet has portions defining a plurality thru holes penetrating the first surface and the second surface; a plurality of resilient supporting portions each having a first end and an opposite second end, in which the first end of each resilient supporting portion connects the sheet, and the resilient supporting portions are respectively connected to the portions of the sheet; a plurality of combined portions respectively connected to the second ends of the resilient supporting portions, in which the thickness of each combined portion is about 0.05 mm to 1 mm; and a plurality of conductive keys of which each key is defined by a bonded portion and an exposed portion, in which the bonded portions of the conductive keys are respectively and seamlessly coupled to the combined portions, and the exposed portions are arranged to allow exposure from the insulating board; and an auxiliary casing having a foldable sheet-like structure. The auxiliary casing has a foldable body, a first connecting portion, and a second connecting portion, in which the first connecting portion and the second connecting portion are respectively connected to the opposite sides of the foldable body. The first connecting portion is fixed on the auxiliary keyboard, the second connecting portion is fixed on the tablet PC while the auxiliary device is adjustable at a desired position or a collapsed position by folding the auxiliary casing. When the second connecting portion of the auxiliary device is fixed on the tablet PC and adjusted at the desired position, the foldable body is used for disposing on a working surface to provide the tablet PC with an acute angle relative to the working surface, the second surface of the insulating board is disposed on the tablet PC, each combined portion and the touch panel of the tablet PC are arranged with a predetermined distance therebetween, and when at least one of the exposed portions is pressed, the resilient supporting portion corresponding to the pressed exposed portion is deformed which causes the combined portion to correspondingly press against the touch panel. When the second connecting portion of the auxiliary device is fixed on the tablet PC and adjusted at the collapsed position, the foldable body, the second connecting portion, and the auxiliary keyboard are collapsibly configured to cover the touch panel of the tablet PC.

Base on the above, the conductive keys are firmly fixed on the insulating board by the connection between each conductive key and each combined portion. The thickness of each combined portion is about 0.05 mm to 1 mm for enabling a current to pass through each combined portion.

DETAILED DESCRIPTION OF THE PREFERRED EMBODIMENTS

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

[First Embodiment]

Figure 1:
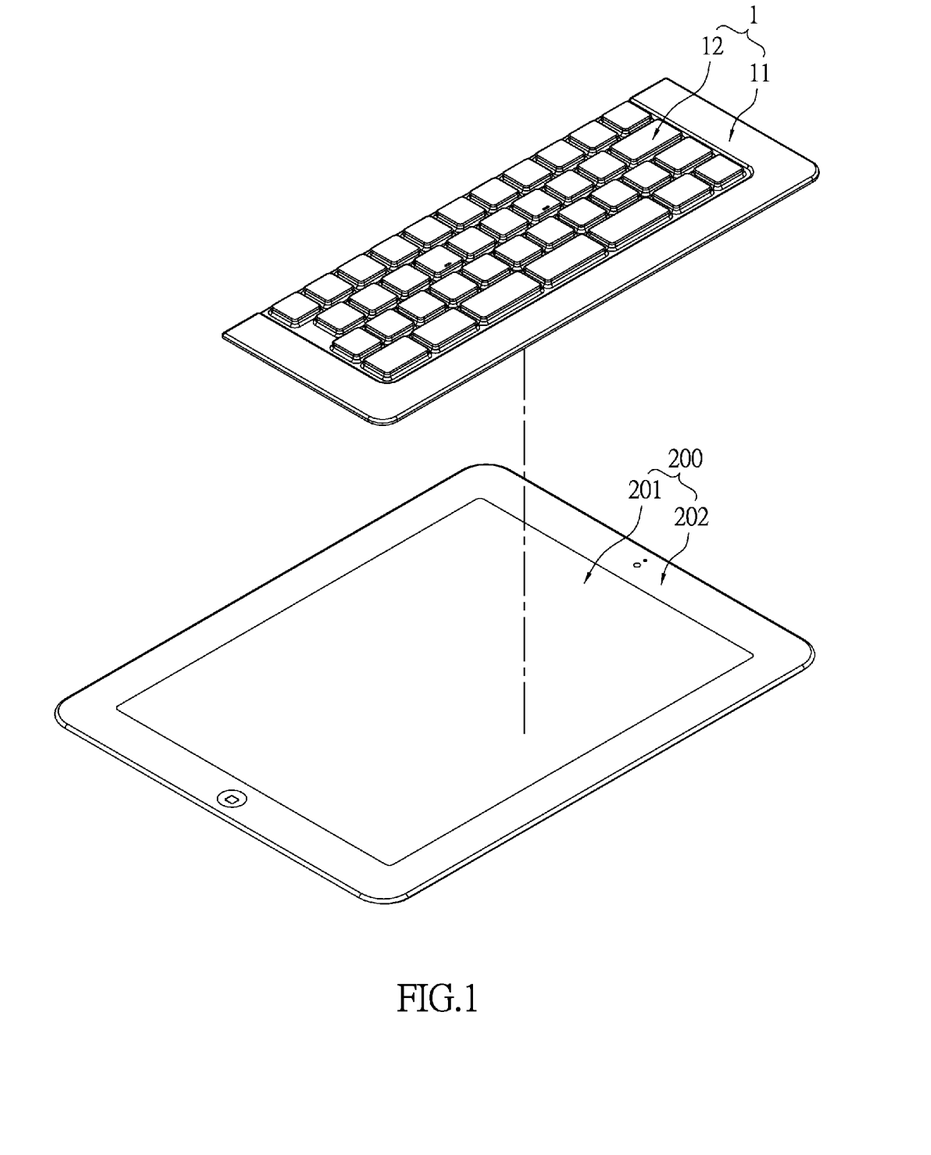
FIG. 1 is an explosive view of the auxiliary keyboard and the tablet PC of the instant disclosure.
Figure 2:
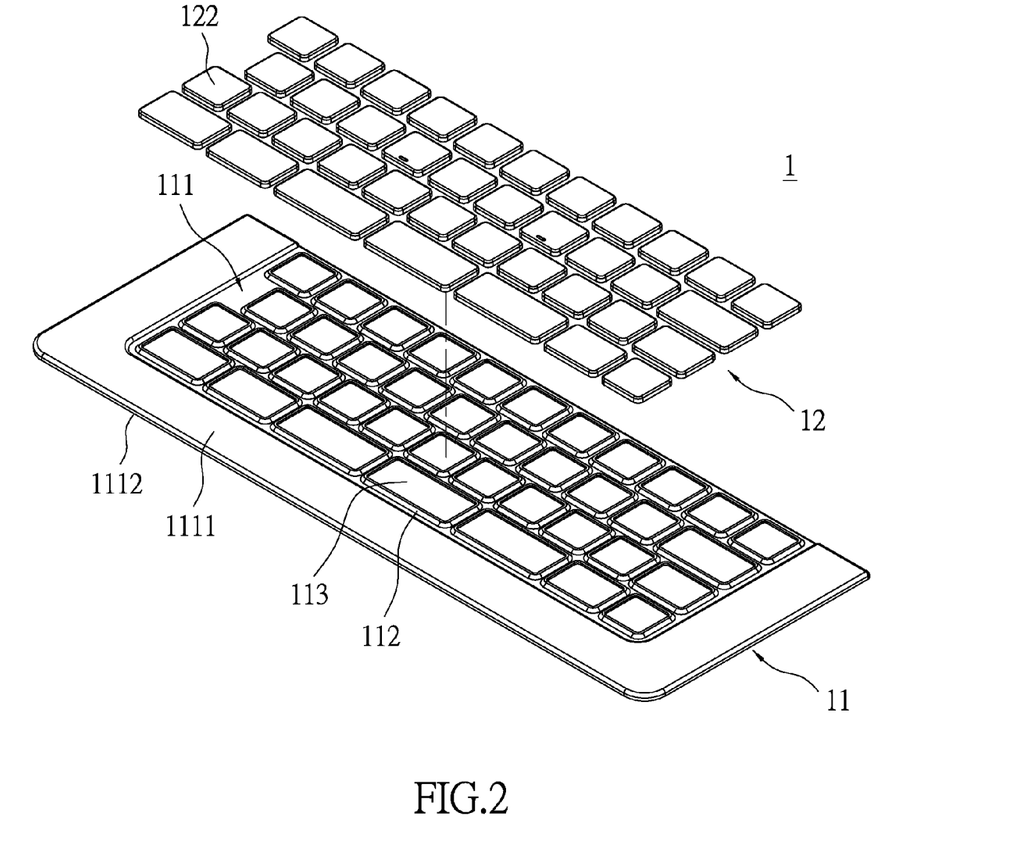
FIG. 2 is an explosive view of the auxiliary keyboard of the instant disclosure.

Please refer to FIG. 1, which shows a first embodiment of the instant disclosure. The embodiment provides an auxiliary keyboard 1 for disposing onto a tablet PC 200 having a touch panel 201. The type of the touch panel 200 can be the resistive touch screen, the surface capacitive touch screen, or other kind of touch panels, but the type of touch panels is not limited to the examples provided herein.

Please refer to FIGS. 2 through 5, which show the auxiliary keyboard 1 having an insulating board 11 and a plurality of conductive keys 12. The conductive keys 12 are integrally formed with the insulating board 11 by the insert molding manner. The insulating board 11 is foldable and integrally formed, in which the insulating board 11 is preferably made from silicone, but not limited thereto. The insulating board 11 has a sheet 111, a plurality of resilient supporting portions 112, and a plurality of combined portions 113.

The sheet 111 has a first surface 1111 and an opposite second surface 1112, and the sheet 111 has a plurality of portions respectively defining a plurality thru holes 1113 penetrating the first surface 1111 and the second surface 1112. The portion of the sheet 111, which defines the thru holes 1113, is used to align the touch panel 201 of the tablet PC 200 and has an U-shaped for disposing on a frame 202 of the tablet PC 200. The frame 202 is arranged around the touch panel 201. Moreover, the sheet 111 has a plurality of troughs 1114 formed on the second surface 1112, such that the thru holes 1113 are air communicable with one another via the troughs 1114, and the thru holes 1113 are air communicable with the surrounding via the troughs 1114 which are arranged on an edge of the sheet 111.

Each resilient supporting portion 112 has a first end 1121 and an opposite second end 1122. The first end 1121 of each resilient supporting portion 112 connects to the portions of the sheet 111, and the resilient supporting portions 112 are respectively correspondingly arranged to the thru holes 1113. The second end 1122 of each resilient supporting portion 112 connects to each combined portion 113. Specifically, each resilient supporting portion 112 and each combined portion 113 are sequentially extended from the first surface 1111 of the sheet 111 and extended away from the second surface 1112. The space defined by each resilient supporting portion 112 gradually reduces from the first end 1121 to the second end 1122.

Each conductive key 12 has a block-like shape and is defined by a bonded portion 121 and an exposed portion 122. The bonded portions 121 are respectively confined by the combined portions 113. The bonded portions 121 of the conductive keys 12 are respectively and seamlessly coupled to the combined portions 113 and the exposed portions 122 are exposed from the insulating board 11.

Since the configuration of the conductive keys 12 and the combined portions 113 with respect to the resilient supporting portions 112 are identical, the following description further explains the auxiliary keyboard 1 in detail, specifically, one conductive key 12 and the coupling portion of the insulating board 11. The coupling portion of the insulating board 11 is the combined portion 113 which is coupled to the conductive key 12 and the corresponding resilient supporting portion 112.

The combined portion 113 has a trough-like structure. The combined portion 113 has a bottom wall 1131 and an annular lateral wall 1132 connected between the second end 1122 of the resilient supporting portion 112 and the lateral edge of the bottom wall 1131. That is to say, the resilient supporting portion 112 and the combined portion 113 are arranged on one side of the sheet 111.

Figure 3:
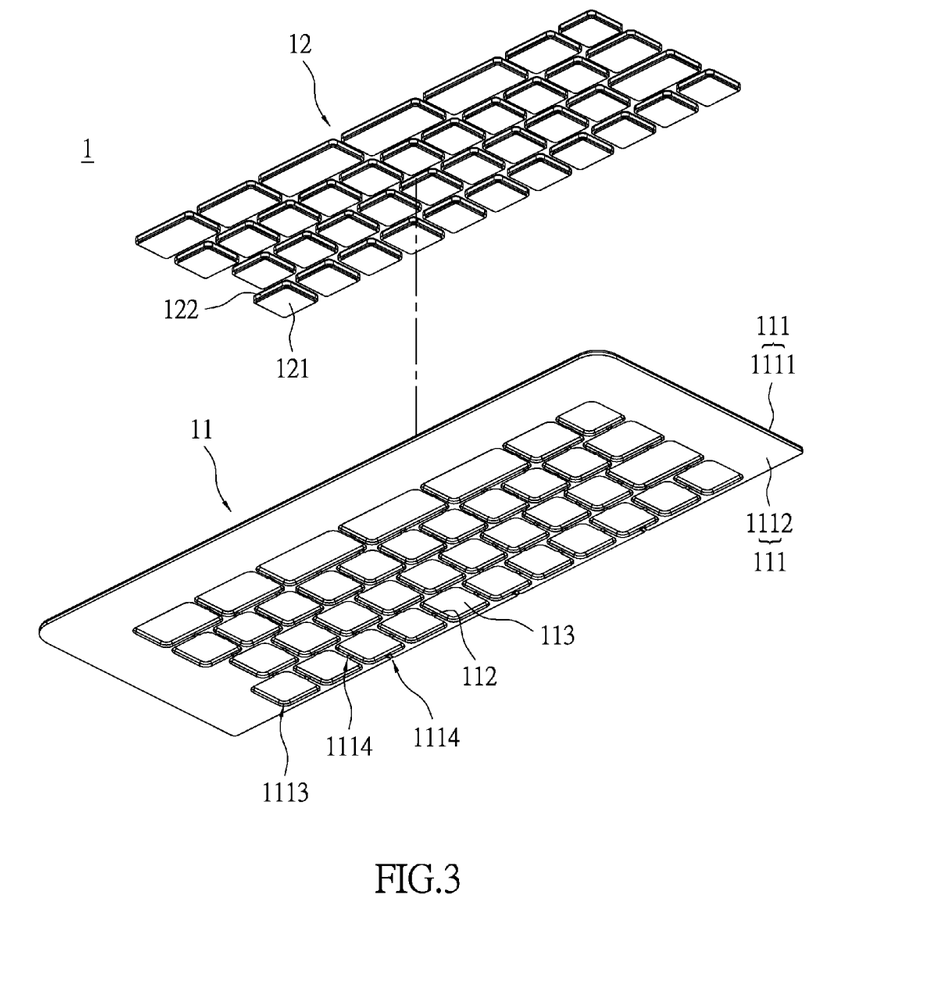
FIG. 3 is another explosive view of the auxiliary keyboard of the instant disclosure.
Figure 4:
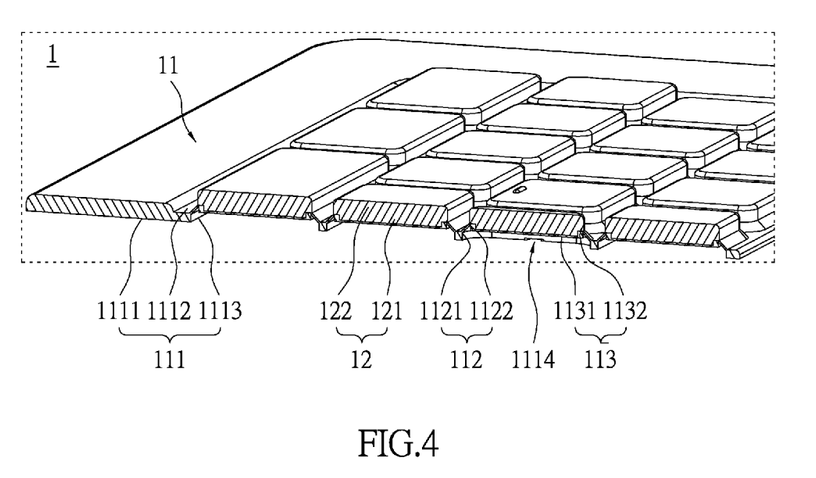
FIG. 4 is a cross-sectional view of the auxiliary keyboard of the instant disclosure.

The bonded portion 121 conforms to the combined portion 113 in shape, and the cross-sectional area of the bonded portion 121 is smaller than the cross-sectional area of the exposed portion 122. An outside surface of the bonded portion 121 is seamlessly coupled to the inside surface of the bottom wall 1131 and the inside surface of the annular lateral wall 1132. The surface of the exposed portion 122 connected to the bonded portion 121 is seamlessly coupled to the corresponding combined portion 113 (e.g., the top surface of the annular lateral wall 1132 as shown in FIG. 3). The combined portion 113 and the bonded portion 121 are arranged in a space surroundingly defined by the resilient supporting portion 112.

However, the conductive key 12 in this embodiment have different cross-sectional dimensions for the bonded portion 121 and the exposed portion 122 while cross-sectional dimensions of the bonded portion 121 and the exposed portion 122 of the conductive key 12 may have the same cross-sectional area. That is to say, the conductive key 12 may have a cuboid shape.

Figure 5:
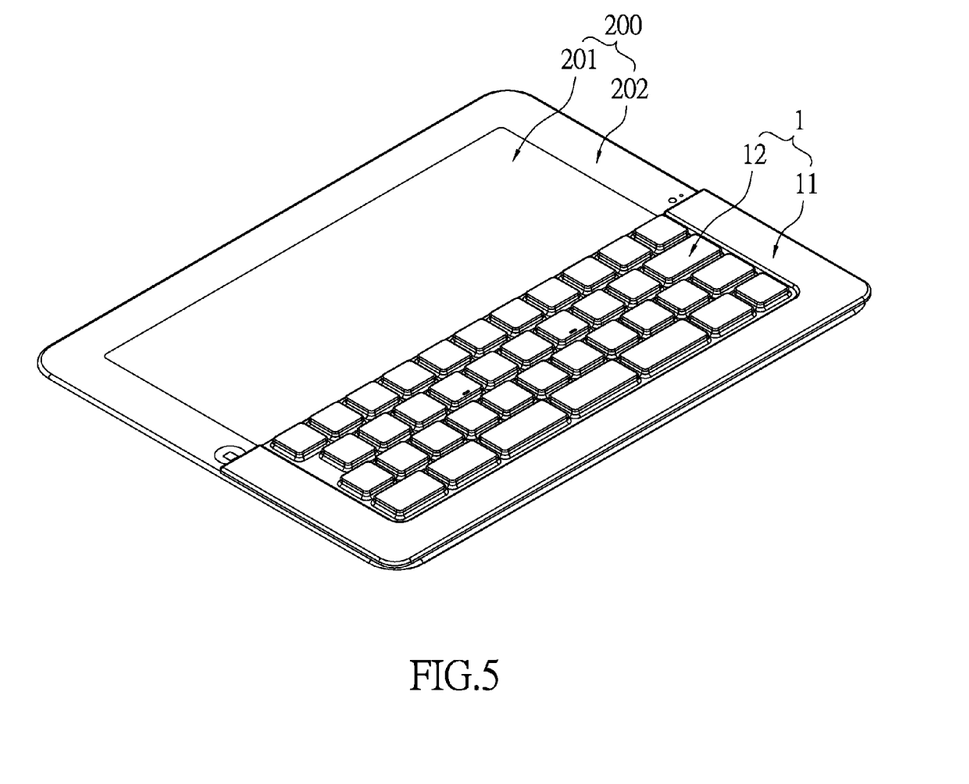
FIG. 5 is a perspective view showing the auxiliary keyboard disposed on the tablet PC according to the instant disclosure.

The structure of the auxiliary keyboard 1 has been stated, the following description describes the operating process of the auxiliary keyboard 1. When the second surface 1112 of the insulating board 11 of the auxiliary keyboard 1 is disposed on the frame 202 of the tablet PC 200, each combined portion 113 and the touch panel 201 of the tablet PC 200 are arranged with a predetermined distance, such that when at least one of the exposed portions 122 is pressed by a user, the resilient supporting portion 112 corresponding to the pressed exposed portion 122 is deformed which causes the bottom wall 1131, which is corresponding to the pressed exposed portion 122, to press against the touch panel 201. Moreover, when user presses each exposed portion 122, the auxiliary keyboard 1 provides user with a pressing sensation and force feedback via the deformation of the resilient supporting portion 112.

Specifically, the conductive keys 12 are firmly fixed on the insulating board 11 by the connection between each conductive key 12 and each combined portion 113. The thickness of each combined portion 113 (e.g. the bottom wall 1131) is about 0.05 mm to 1 mm for enabling a current, which is generated between the tablet PC and user's finger, to pass through each combined portion 113 (e.g. the bottom wall 1131). Additionally, each combined portion 113 (e.g. the bottom wall 1131) is preferable about 0.1 mm to 0.2 mm.

[Second Embodiment]

Figure 6:
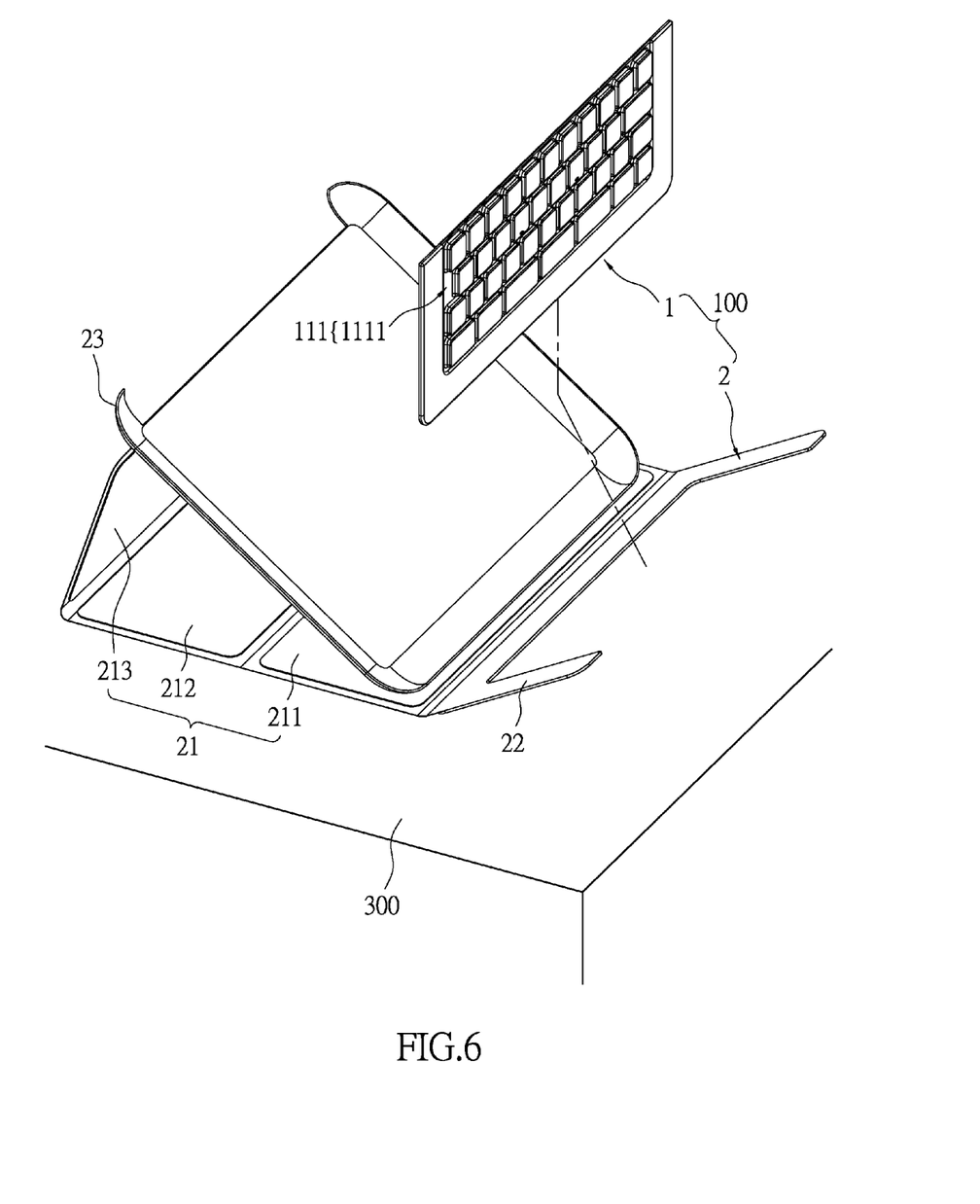
FIG. 6 is an explosive view of the auxiliary input device of the instant disclosure.

Please refer to FIG. 6, which shows a second embodiment of the instant disclosure. This embodiment provides an auxiliary input device 100 for installing on the tablet PC 200. The auxiliary input device 100 has the auxiliary keyboard 1 of the first embodiment and an auxiliary casing 2. The structure of the auxiliary keyboard 1 has already been stated in the first embodiment such that this embodiment will not restate the structure of the auxiliary keyboard 1 once again.

The auxiliary casing 2 has a foldable sheet-like structure. The auxiliary casing 2 has a foldable body 21, a first connecting portion 22, and a second connecting portion 23. The first connecting portion 22 and the second connecting portion 23 are respectively arranged on the opposite sides of the foldable body 21. The first connecting portion 22 is fixed on (e.g., adhered to) the U-shaped periphery portion of the first surface 1111 of the sheet 111, and the first connecting portion 22 is arranged around the conductive keys 12. The second connecting portion 23 is fixed on (e.g., buckled to) the back side of the tablet PC 200. Moreover, the fixed manner of the first connecting portion 22 or the second connecting portion 23 can be replaced by the magnetism or the other manners.

Figure 12:
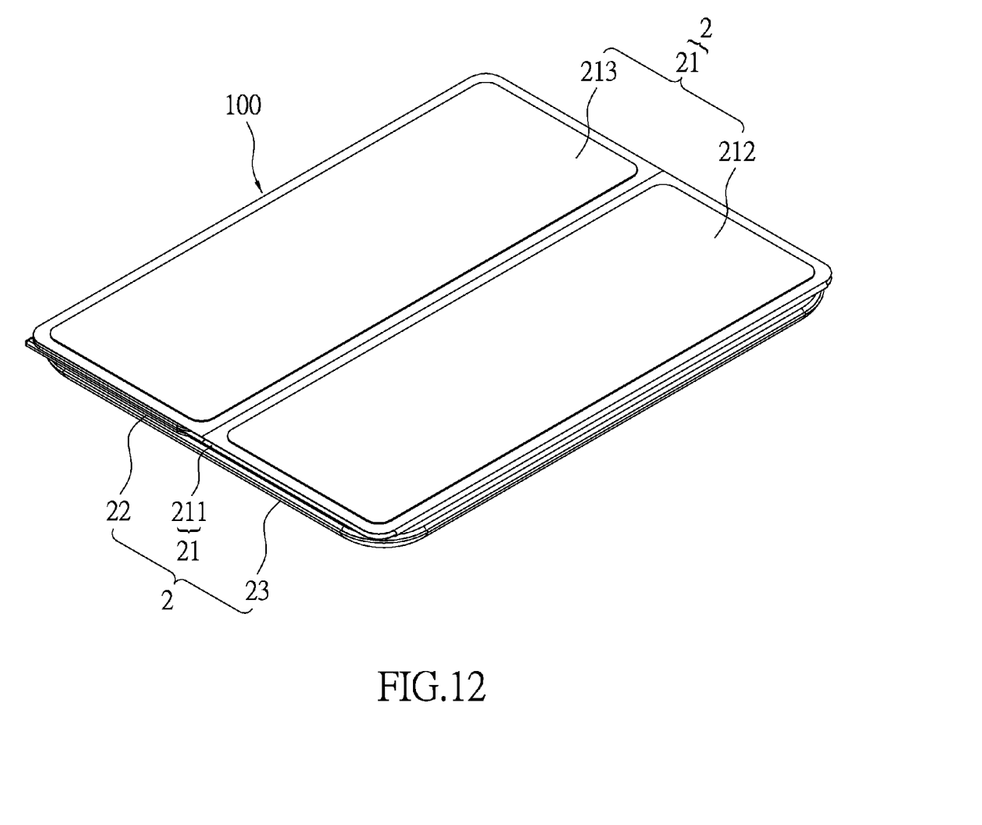
FIG. 12 is a perspective view showing the auxiliary input device at the collapsed position of the instant disclosure.

The foldable body 21 is defined by a first plate 211, a second plate 212, and a supporting plate 213, which are sequentially arranged from the first connecting portion 22 to the second connecting portion 23. Any two adjacent segments of the first connecting portion 22, the first plate 211, the second plate 212, the supporting plate 213, and the second connecting portion 23 are pivotally foldable along the connected portion there between. Thus, the auxiliary device 100 is adjustable at a desired position (as shown in FIG. 7) or a collapsed position (as shown in FIG. 12) by folding the auxiliary casing 2.

Figure 7:
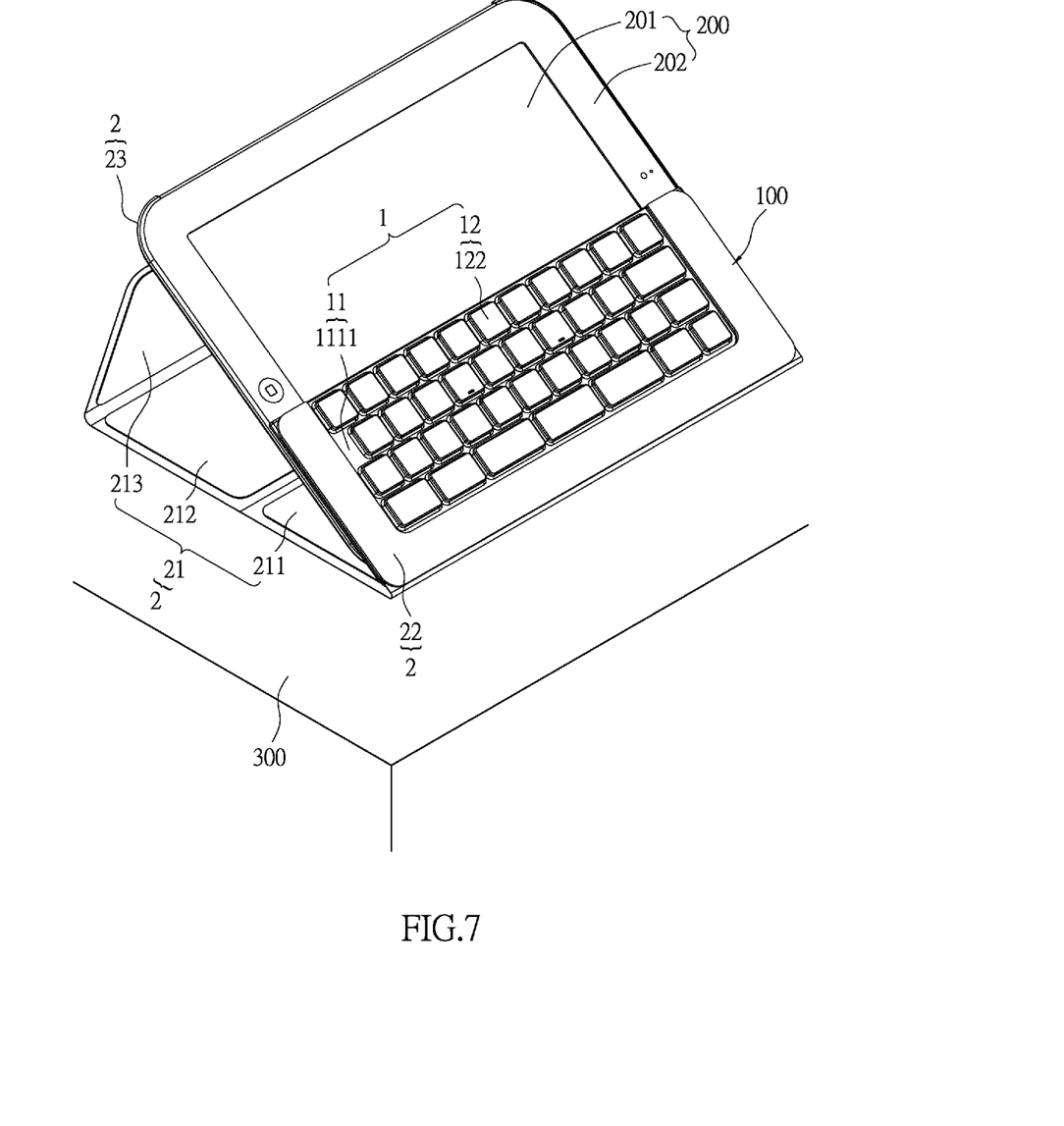
FIG. 7 is a perspective view showing the auxiliary input device at the desired position according to the instant disclosure.
Figure 8:
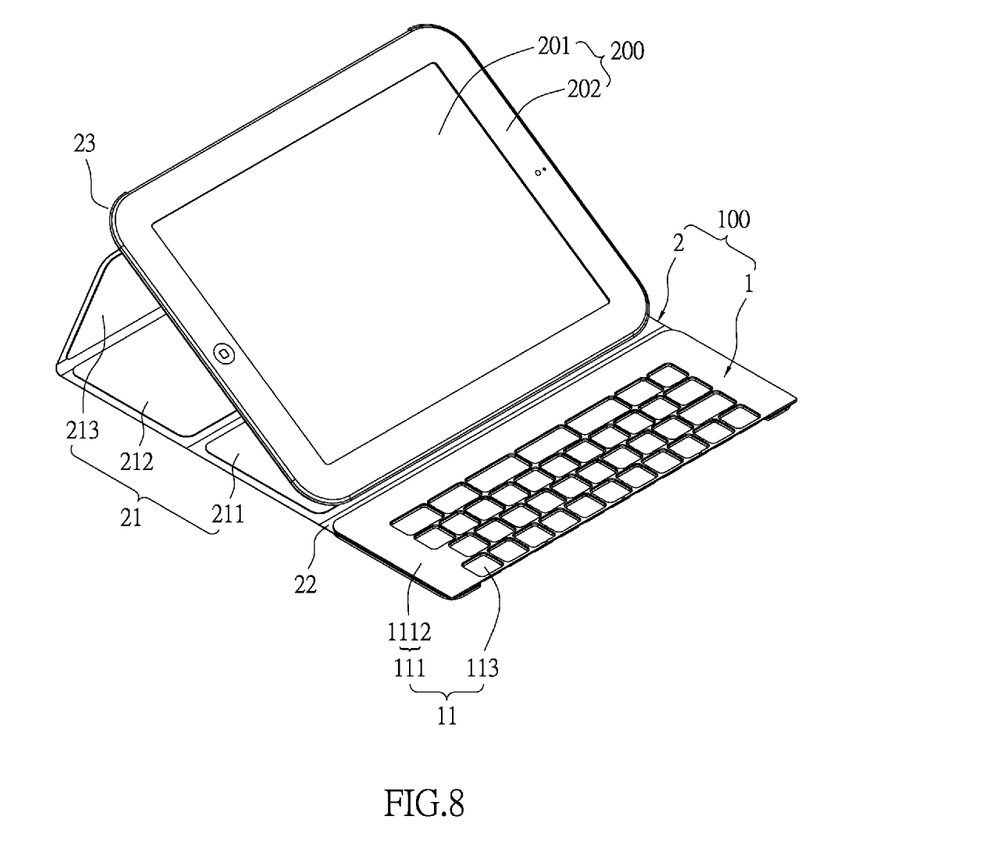
FIG. 8 is a perspective view showing the first operating process of the auxiliary input device according to the instant disclosure.
Figure 9:
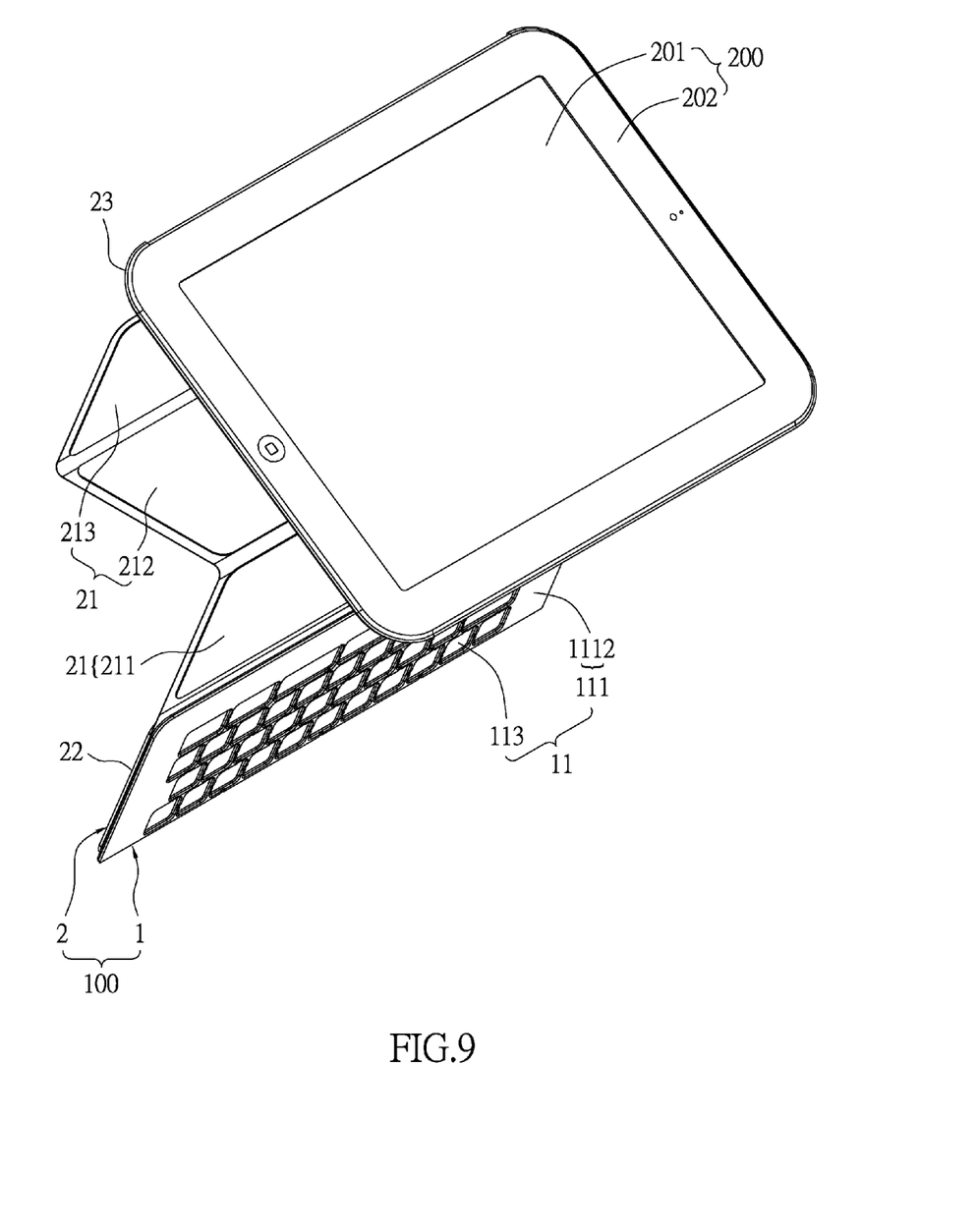
FIG. 9 is a perspective view showing the second operating process of the auxiliary input device according to the instant disclosure.
Figure 10:
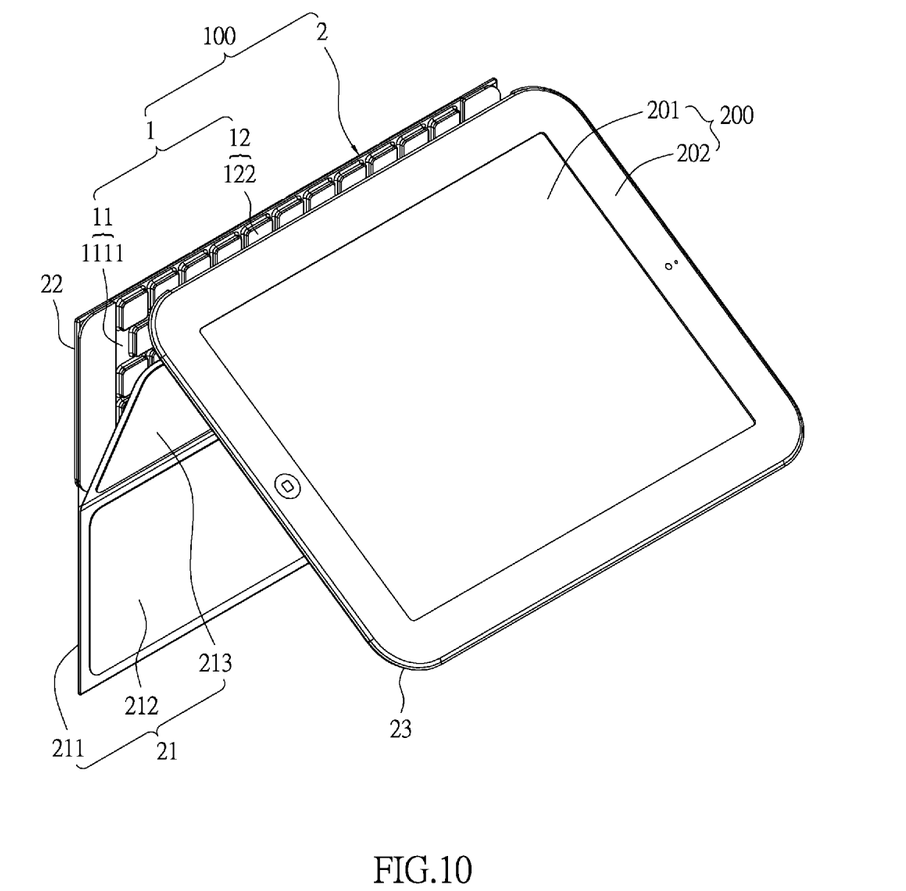
FIG. 10 is a perspective view showing the third operating process of the auxiliary input device according to the instant disclosure.
Figure 11:
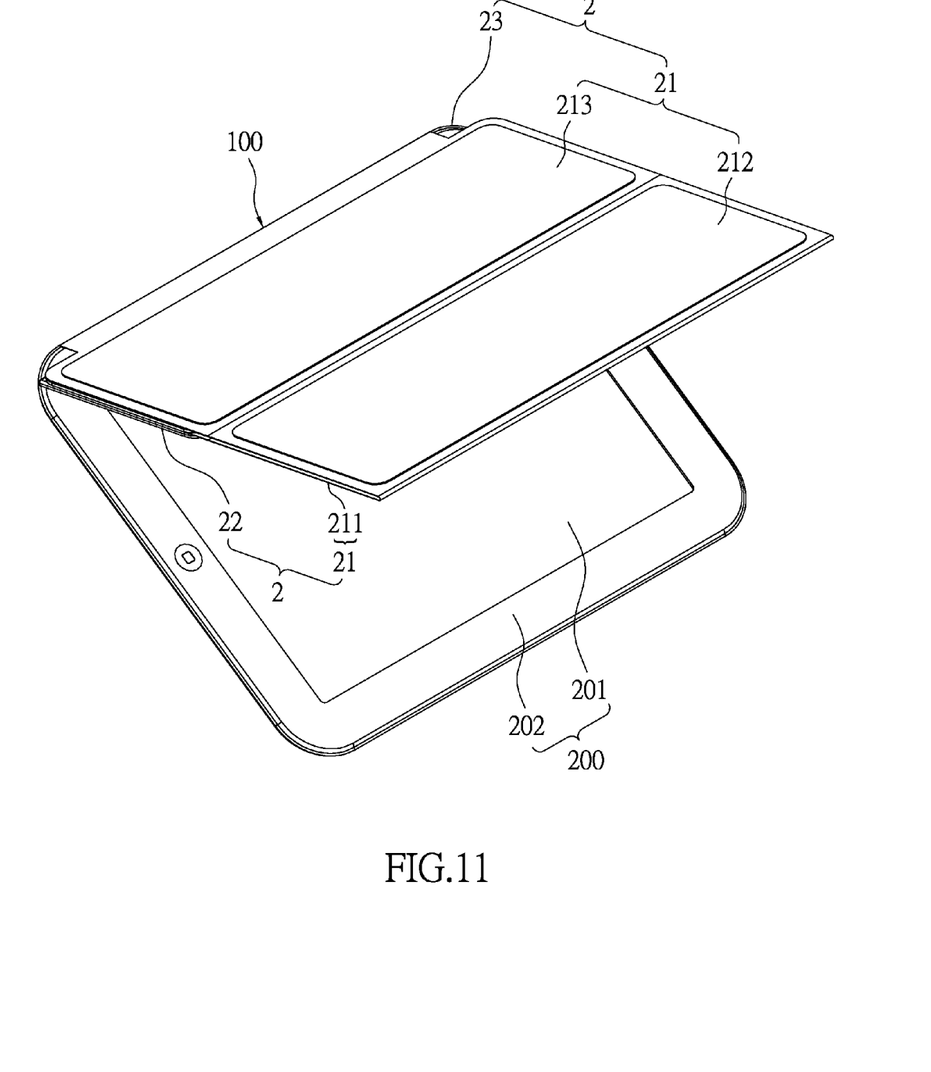
FIG. 11 is a perspective view showing the fourth operating process of the auxiliary input device according to the instant disclosure.

Please refer to FIG. 7, which shows that the second connecting portion 23 of the auxiliary device 100 is fixed on the tablet PC 200 and the auxiliary device 200 is adjusted at the desired position. The first plate 211 and the second plate 212 of the foldable body 21 are arranged at the same plane and used for disposing on a working surface 300 (e.g., desktop), and the supporting plate 213 is at an acute angle relative to the second plate 212 to cause the tablet PC 200 at an acute angle relative to the working surface 300. Moreover, the second surface 1112 of the insulating board 11 is disposed on the frame 202 of the tablet PC 200 to cause the auxiliary keyboard 1 at an acute angle relative to the first plate 211, such that the bottom portion of the tablet PC 200 is clipped between the auxiliary keyboard 1 and the first plate 211.

Please refer to FIGS. 7 through 12, which show the processes about the auxiliary input device 100 adjusted from the desired position to the collapsed position. Separating the auxiliary keyboard 1 from the tablet PC 200; rotating the first plate 211, the auxiliary keyboard 1, and the first connecting portion 22 along the connecting portion between the first and the second plates 211, 212 to stack the first plate 211 on the second plate 212 and to stack the first surface 1111 of the auxiliary keyboard 1 and the first connecting portion 22 on the supporting plate 213; rotating the foldable body 21, the first connecting portion 22, and the auxiliary keyboard 1 along the connecting portion between the second connecting portion 23 and the supporting plate 213 to cover the touch panel 201 of the tablet PC 200, which is defined as the collapsed position.

Thus, when the auxiliary input device 100 is at the collapsed position, the touch panel 201 is arranged at one side of the first connecting portion 22, the auxiliary keyboard 1, and the first plate 211, and the second plate 212 and the supporting plate 213 are arranged at another side of the first connecting portion 22, the auxiliary keyboard 1, and the first plate 211.

Figure 13:
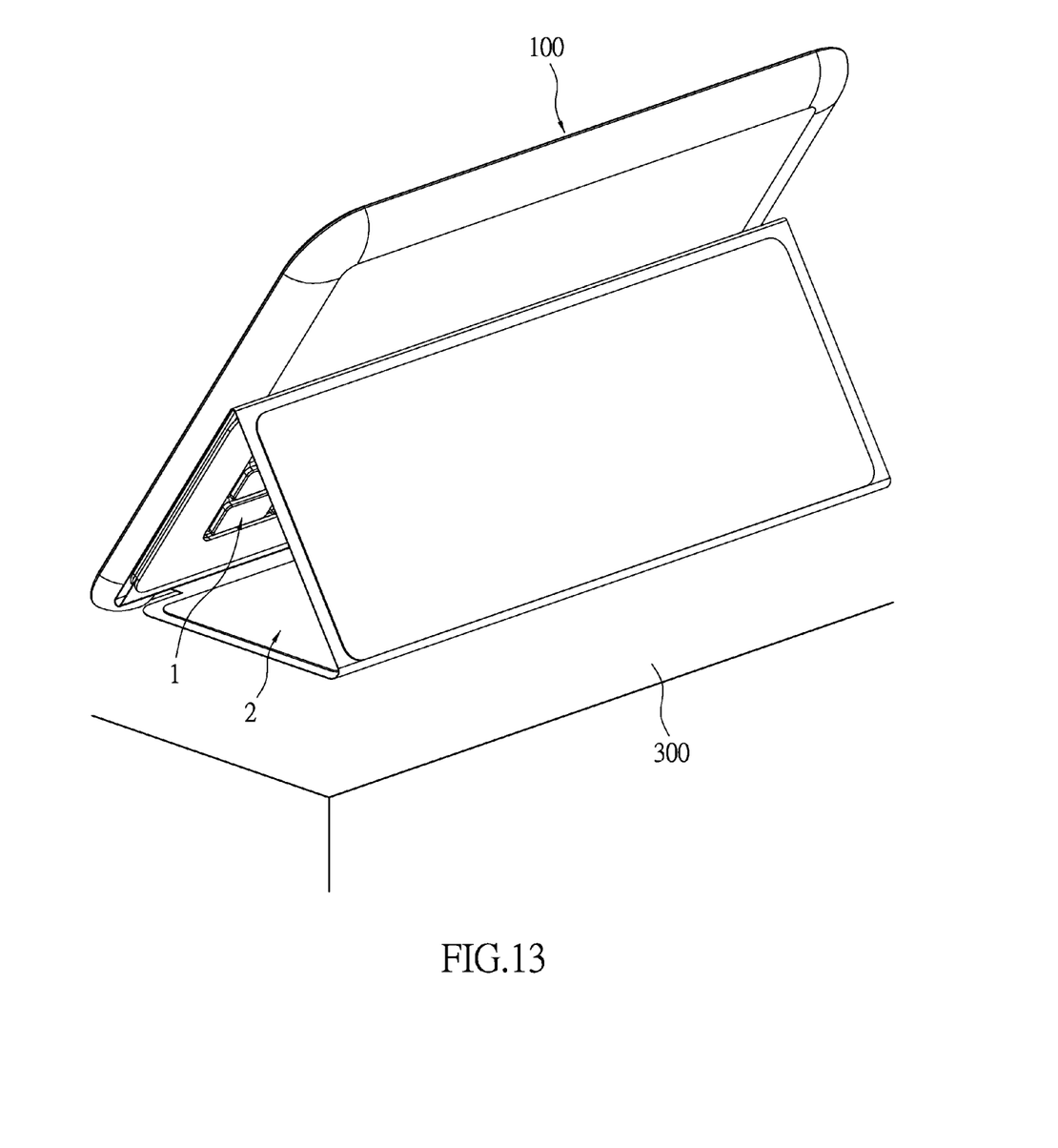
FIG. 13 is a perspective view showing the auxiliary input device applied as a supporting seat of the instant disclosure.

Besides, the auxiliary input device 100 can be folded as a supporting seat (as shown in FIG. 13), in more detail, the auxiliary keyboard 1, the first connecting portion 22, and the foldable body 21 are folded into a triangle shape and disposed on the working surface 300, and the tablet PC 300 fixed on the second connecting portion 23 is at an acute angle relative to the working surface 300. That is to say, the auxiliary keyboard 1 is not limited to be disposed on the tablet PC 200, such that the user can operate or observe the whole touch panel 201 of the tablet PC 200.

Base on the description above, the conductive keys of the auxiliary keyboard are firmly fixed on the insulating board by the bonded portions being respectively confined by the combined portions. Moreover, the thickness of each combined portion 113 is about 0.05 mm to 1 mm (preferable is 0.1 mm to 0.2 mm) for enabling the current, which is generated between the tablet PC and user's finger, to pass through each combined portion.

Additionally, the instant disclosure also provides the auxiliary casing to support the tablet PC, that is to say, the user operates the auxiliary keyboard easily by the auxiliary casing when the auxiliary input device is at the desired position, or the touch panel of the tablet PC is protected by the auxiliary casing when the auxiliary input device is at collapsed position.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An auxiliary keyboard for detachably disposing on a tablet PC, comprising:

an insulating board integrally formed in one piece, the insulating board comprising:
  a sheet having a first surface and an opposite second surface, wherein the sheet has a plurality of portions respectively defining a plurality of thru holes penetrating the first surface and the second surface;
  a plurality of resilient supporting portions each having a first end and an opposite second end, wherein the first end of each resilient supporting portion connects to the sheet, and the resilient supporting portions are respectively connected to the portions of the sheet; and
  a plurality of combined portions respectively connected to the second ends of the resilient supporting portions; and a plurality of electrically conductive keys each having a bonded portion and an exposed portion, wherein the bonded portions of the conductive keys are respectively and seamlessly coupled to the combined portions, and the exposed portions are arranged to allow exposure from the insulating board;

wherein when the second surface of the insulating board is detachably disposed on a touch panel of the tablet PC, each combined portion and the touch panel of the tablet PC are arranged with a predetermined distance, the combined portions respectively align with a plurality of virtual keys displayed on the touch panel, and the auxiliary keyboard is electrically isolated from the touch panel of the tablet PC;

wherein when the second surface of the insulating board is detachably disposed on the touch panel and at least one of the exposed portions of the conductive keys is pressed, the resilient supporting portion corresponding to the pressed exposed portion is deformed which causes the combined portion to correspondingly press against the touch panel, and the thickness of each combined portion is about 0.05~1 mm to allow a current to travel between the pressed conductive key and the touch panel of the tablet PC.

2. The auxiliary keyboard as claimed in claim 1, wherein the combined portions and the bonded portions are respectively arranged in a plurality of spaces surroundingly defined by the resilient supporting portions.

3. The auxiliary keyboard as claimed in claim 1, wherein the combined portions each has a trough-like structure, the bonded portions correspondingly conform to the combined portions in shape, and the bonded portions are respectively confined by the combined portions.

4. The auxiliary keyboard as claimed in claim 3, wherein in each conductive key, the cross-sectional area of the bonded portion is smaller than the cross-sectional of the exposed portion, and a surface of the exposed portion connected to the bonded portion is seamlessly coupled to the corresponding combined portion.

5. The auxiliary keyboard as claimed in claim 1, wherein the thickness of each combined portion is about 0.1 mm to 0.2 mm.

6. An auxiliary input device for detachably disposing on a tablet PC, comprising:
an auxiliary keyboard, comprising:
an insulating board integrally formed in one piece, comprising:
a sheet having a first surface and an opposite second surface, wherein the sheet having a plurality of portions respectively defining a plurality of thru holes penetrating the first surface and the second surface;
a plurality of resilient supporting portions each having a first end and an opposite second end, wherein the first end of each resilient supporting portion connects the sheet, and the resilient supporting portions are respectively connected to the portions of the sheet; and
a plurality of combined portions respectively connected to the second ends of the resilient supporting portions; and
a plurality of electrically conductive keys each having a bonded portion and an exposed portion, wherein the bonded portions of the conductive keys are respectively and seamlessly coupled to the combined portions, and the exposed portions are arranged to allow exposure from the insulating board;
an auxiliary casing having a foldable sheet-like structure, the auxiliary casing having a foldable body, a first connecting portion, and a second connecting portion;

wherein the first connecting portion and the second connecting portion are respectively arranged on the opposite sides of the foldable body, the first connecting portion is fixed on the auxiliary keyboard, the second connecting portion is fixable onto the tablet PC, and the auxiliary input device is adjustable to a desired position or a collapsed position by folding the auxiliary casing;

wherein when the second connecting portion of the auxiliary input device is fixed onto the tablet PC and the auxiliary input device is adjusted to the desired position, the foldable body is disposed on a working surface so as to configure the tablet PC at an acute angle relative to the working surface, the second surface of the insulating board is detachably disposed on a touch panel of the tablet PC, each combined portion and the touch panel of the tablet PC are configured with a predetermined distance, the combined portions respectively align with a plurality of virtual keys displayed on the touch panel, and the auxiliary keyboard is electrically isolated from the tablet PC;

wherein when the second surface of the insulating board is detachably disposed on the touch panel and at least one of the exposed portions of the conductive keys is pressed, the resilient supporting portion corresponding to the pressed exposed portion is deformed which causes the combined portion to correspondingly press against the touch panel, and the thickness of each combined portion is about 0.05~1 mm to allow a current to travel between the pressed conductive key and the touch panel of the tablet PC;

wherein when the second connecting portion of the auxiliary input device is fixed onto the tablet PC and adjusted at the collapsed position, the foldable body, the second connecting portion, and the auxiliary keyboard are collapsibly configured to cover the touch panel of the tablet PC.

7. The auxiliary input device as claimed in claim 6, wherein the first connecting portion is coupled to the first surface of the insulating board, and the first connecting portion surrounds the conductive keys.

8. The auxiliary input device as claimed in claim 6, wherein the combined portions and the bonded portions are respectively arranged in a plurality of spaces surroundingly defined by the resilient supporting portions.

9. The auxiliary input device as claimed in claim 6, wherein the combined portions each has a trough-like structure, the bonded portions correspondingly conform to the combined portions in shape, and the bonded portions are respectively confined by the combined portions.

10. The auxiliary input device as claimed in claim 9, wherein in each conductive key, the cross-sectional area of the bonded portion is smaller than the cross-sectional of the exposed portion, and a surface of the exposed portion connected to the bonded portion is seamlessly coupled to the corresponding combined portion.

* * * * *